United States Patent
Ueda et al.

(10) Patent No.: US 8,213,046 B2
(45) Date of Patent: Jul. 3, 2012

(54) IMAGE FORMING APPARATUS

(75) Inventors: Masashi Ueda, Nagoya (JP); Hirotoshi Maehira, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 903 days.

(21) Appl. No.: 12/241,732

(22) Filed: Sep. 30, 2008

(65) Prior Publication Data

US 2009/0086220 A1   Apr. 2, 2009

(30) Foreign Application Priority Data

Oct. 1, 2007   (JP) ................. 2007-257850

(51) Int. Cl.
*G06F 15/00*   (2006.01)
*G06K 15/00*   (2006.01)
*G06K 15/10*   (2006.01)
*G08C 15/00*   (2006.01)
*G03G 15/00*   (2006.01)

(52) U.S. Cl. .......... 358/1.5; 358/3.03; 358/1.8; 358/1.9; 370/252; 399/389

(58) Field of Classification Search ............ 358/3.03, 358/1.5, 1.8, 1.9; 370/252; 399/389
See application file for complete search history.

(56) References Cited

U.S. PATENT DOCUMENTS

| | | | |
|---|---|---|---|
| 5,988,790 A | 11/1999 | Koike et al. | |
| 6,012,797 A | 1/2000 | Iwata et al. | |
| 6,069,709 A | 5/2000 | Harrington | |
| 6,318,832 B1 | 11/2001 | Bates et al. | |
| 6,607,317 B2 | 8/2003 | Morozumi et al. | |
| 6,963,423 B2 | 11/2005 | Ogasahara | |
| 7,907,306 B2 * | 3/2011 | Yamazaki | 358/3.03 |
| 7,926,894 B2 | 4/2011 | Nunokawa | |
| 2002/0054305 A1 | 5/2002 | Ogasahara | |
| 2005/0219650 A1 | 10/2005 | Kondo et al. | |
| 2006/0262329 A1 | 11/2006 | Fujimori | |
| 2008/0001980 A1 | 1/2008 | Maehira et al. | |

FOREIGN PATENT DOCUMENTS

| | | |
|---|---|---|
| EP | 0076948 A | 4/1983 |
| EP | 0430451 A | 6/1991 |
| EP | 0507328 | 10/1992 |

(Continued)

OTHER PUBLICATIONS

Robert Ulichney: "Digital Halftoning" 1987, MIT Press, London, England, XP002520218, p. 239-p. 240.

(Continued)

*Primary Examiner* — Charlotte M Baker
*Assistant Examiner* — Justin Katzwhite
(74) *Attorney, Agent, or Firm* — Banner & Witcoff, Ltd.

(57) ABSTRACT

A print method and apparatus for minimizing effects of error in repositioning during printing process may include generating successive scans of a recording head, wherein the scans may partially overlap to account for the error in repositioning. As an example, after the recording head makes one scan across the document being printed, the document (or the head) may be repositioned for the next scan so that several print elements of the recording head are aligned to lie between certain rows of dots printed in the previous scan, resulting in a higher number of rows in the overlapping portion of the scans. Additional features may include varying the row/column arrangement of dots in the overlap portion, or performing error diffusion and correction for different areas of resolution in the scans.

20 Claims, 10 Drawing Sheets

FOREIGN PATENT DOCUMENTS

| | | |
|---|---|---|
| EP | 0518670 | 12/1992 |
| EP | 0723872 A | 7/1996 |
| EP | 0978387 A | 2/2000 |
| EP | 1330113 A | 7/2003 |
| EP | 1398157 A | 3/2004 |
| EP | 1452313 | 9/2004 |
| EP | 1497519 | 11/2004 |
| JP | 61120578 | 6/1986 |
| JP | 62005771 | 1/1987 |
| JP | 61120578 | 6/1989 |
| JP | 5057965 | 3/1993 |
| JP | 06024003 | 2/1994 |
| JP | 6233375 | 8/1994 |
| JP | 11078100 | 3/1999 |
| JP | 2002144637 | 5/2002 |
| JP | 2002210942 | 7/2002 |
| JP | 2003305830 | 10/2003 |
| JP | 2004034720 | 2/2004 |
| JP | 2005199609 | 7/2005 |
| JP | 2005254574 | 9/2005 |
| JP | 2006076219 | 3/2006 |
| JP | 2006088427 | 4/2006 |
| JP | 2006186755 | 7/2006 |
| JP | 2006240043 | 9/2006 |
| JP | 2008006689 | 1/2008 |
| WO | 2006013764 | 2/2006 |

OTHER PUBLICATIONS

EP Search Report, Application 08253175.7, dated Apr. 1, 2009.
U.S. Appl. No. 12/41,792, Image Forming Apparatus, filed Sep. 30, 2008.
Notice of Reasons for Rejection in JP Application No. 2007-257850, Mailing Dae: Aug. 4, 2009.
EP Appln. No. 08253190.6-1522; European Search Report dated Dec. 30, 2088.
JP Notice of Reasons for Rejection in JP 2007-257054, dated Aug. 4, 2009, translated.
Final Office Action dated Mar. 16, 2011, issued in U.S. Appl. No. 12/241,792.
Non-Final Office Action dated Sep. 14, 2010, issued in U.S. Appl. No. 12/241,792.
Non-Final Office Action dated Dec. 15, 2010, issued in U.S. Appl. No. 12/241,792.

* cited by examiner

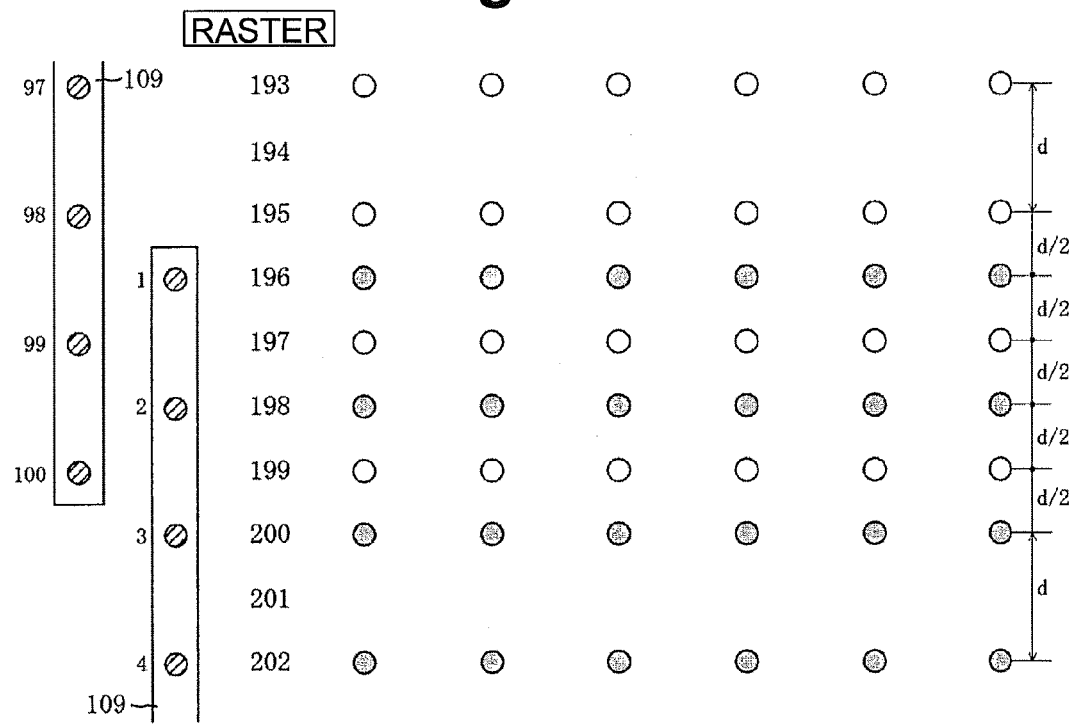
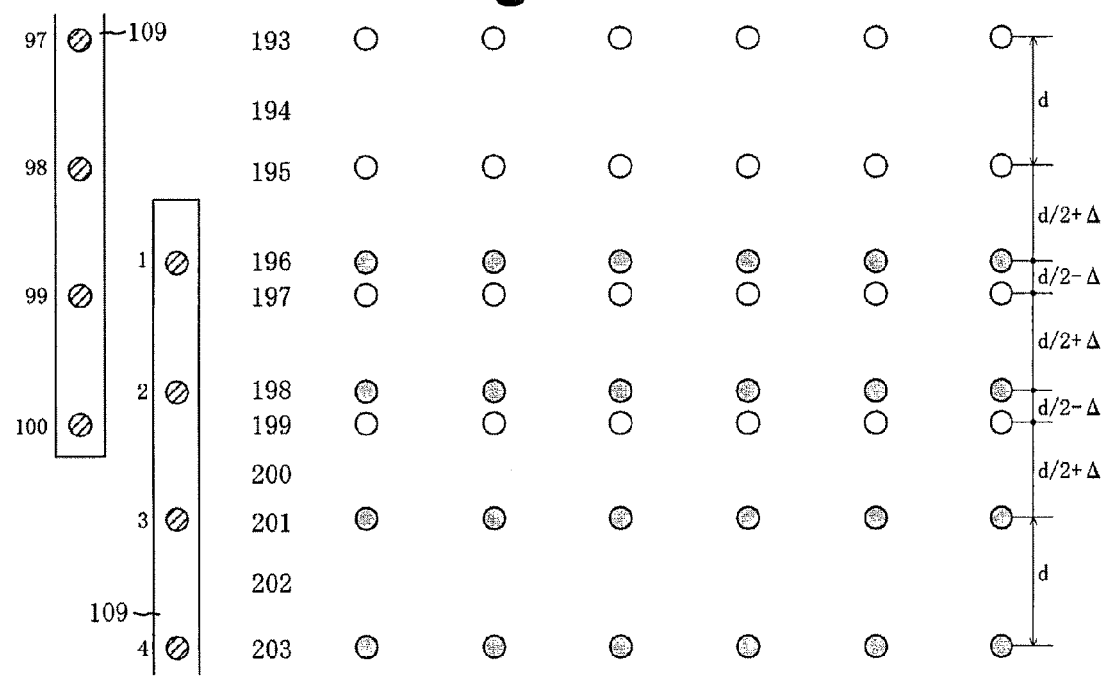

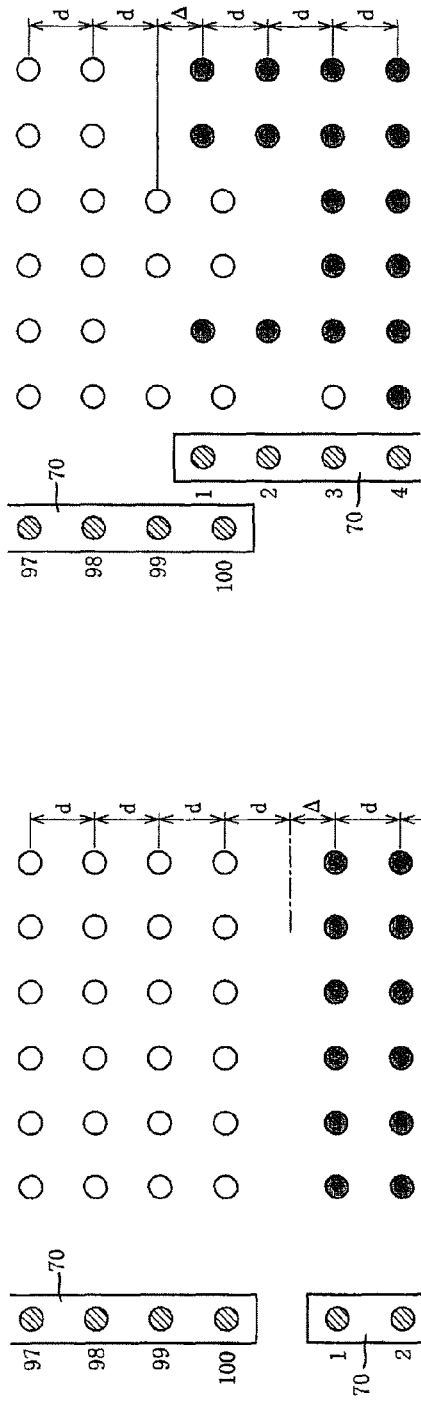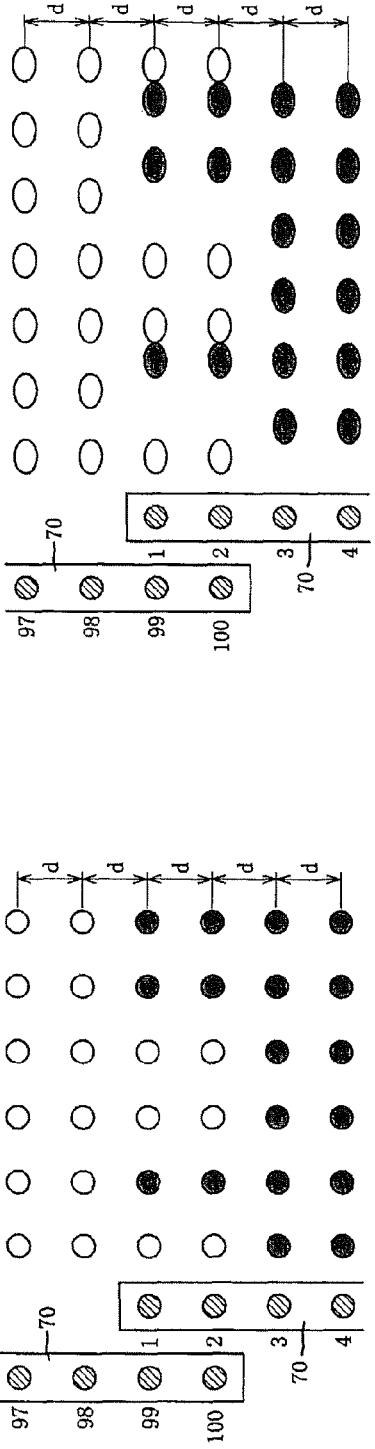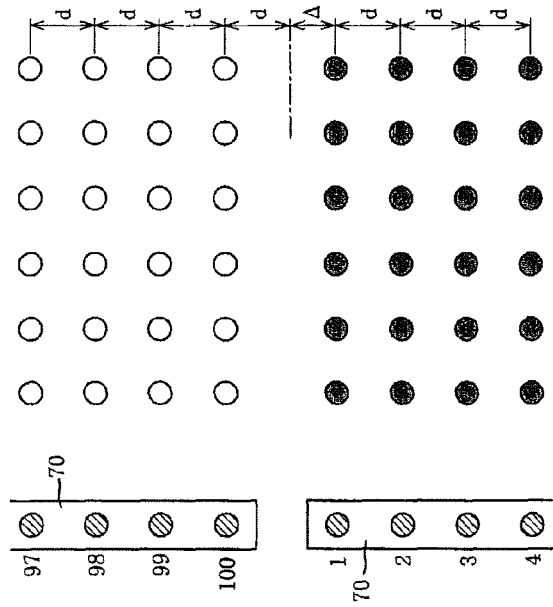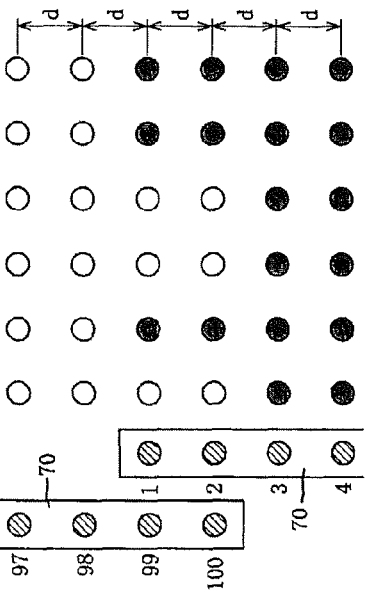

IMAGE FORMING APPARATUS

CROSS REFERENCE TO RELATED APPLICATION

This application claims priority from Japanese Patent Application No. 2007-257850 filed on Oct. 1, 2007, the entire subject matter of which is incorporated herein by reference.

BACKGROUND

1. Technical Field

Features described herein relate to an image forming apparatus for forming an image on a printing medium.

2. Related Art

A color ink-jet printer is known as an imaging forming apparatus. In this printer, ink droplets are ejected sequentially to a printing medium while an ink head for ejecting plural ink droplets is moved in the main scanning direction. After a scan in the main scanning direction has finished, an auxiliary scan is performed by, for example, moving the printing medium in a direction that crosses (e.g., in a direction that is perpendicular to) the main scanning direction and then a main scan is performed again.

In the ink head, discharge apertures (printing elements) for ejecting ink droplets are arranged in the auxiliary-scanning direction. From a main scan, these apertures eject ink droplets onto a printing medium, forming rows of plural dots arranged in the main scanning direction (sometimes referred to as "rasters"). When the printing medium is thereafter moved in the auxiliary-scanning direction by a ink head length, there may occur a phenomenon that the interval between the tail raster formed by the preceding main scan and the head raster formed by the current main scan becomes wider than the interval between rasters that are formed by one main scan due to, for example, an error of a feed mechanism for feeding the printing medium. In this case, white streaks occur which are called banding.

FIG. 10A shows example banding that occurs in the above manner. An ink-jet head 70 is formed with 100 discharge apertures that are arranged in the auxiliary-scanning direction. Dots indicated by white circles are formed by a main scan (preceding main scan) by the 97th to 100th discharge apertures of the ink-jet head 70 (the depiction of such dots herein assumes, of course, that the image being printed called for dots to be printed at those positions).

Then, after the printing medium has been transported in the auxiliary-scanning direction, dots indicated by black circles are formed by the 1st to 4th discharge apertures of the ink head 70. The printing medium should be transported by 101×d by the auxiliary scan, where d is the pitch of the discharge apertures of the ink-jet head 70. However, assume that the printing medium has been transported excessively (excess distance: Δ). In this case, the distance between the raster formed by the 100th discharge aperture in the preceding main scan and the raster formed by the 1st discharge aperture in the current main scan is equal to d+Δ. The raster interval is increased there to cause banding.

In one known method of reducing such banding, shown in FIG. 10B, the printing area of a preceding main scan and that of a current main scan partly overlap each other, so that for the rasters in the overlap area, some of the dots are printed by the preceding main scan, and the remaining dots are printed by the current main scan.

In the example of FIG. 10B, the rasters of the overlap area are formed by the 99th and 100th discharge apertures of the ink head 70 in the preceding main scan and by the 1st and 2nd discharge apertures of the ink head 70 in the current main scan.

FIG. 10C shows a case of the FIG. 10B technique, in which the printing medium was transported excessively (excess distance: Δ) when it was transported in the auxiliary-scanning direction. Dots formed by the 1st discharge aperture of the ink head 70 are deviated downstream by Δ from dots formed by the 99th discharge aperture of the ink head 70, and dots formed by the 2nd discharge aperture of the ink head 70 are deviated downstream by Δ from dots formed by the 100th discharge aperture of the ink head 70. However, since the gaps caused by these deviations are not located on straight lines, they are less noticeable, and the degree of banding can be reduced.

In the technique discussed above, one raster is printed by plural main scans. If an error occurs between a preceding main scan and a current main scan, dots formed by the preceding main scan and dots formed by the current main scan may overlap with each other. Such overlapping dots may be more noticeable to the human eye, and is unacceptable in view of increasing demand for higher print accuracy. Improving print accuracy is also hampered by the increasing demand for higher print speeds. As the movement speed in the main scanning direction is increased, the shape of the dots becomes less of a circle, and more like an ellipse that is long in the main scanning direction. As the print speed is increased, the time interval between dot formation by a preceding main scan and that by a current main scan (i.e., the time from landing of preceding ink droplets onto a printing sheet to landing of current ink droplets) becomes shorter, and accordingly the dot movement distance from the preceding main scan to the current main scan becomes shorter. Therefore, if a deviation occurs in the main scanning direction, dots formed by the preceding main scan and dots formed by the current main scan become more prone to overlap with each other. When a dot of the current main scan is superimposed on a dot of the preceding main scan before the latter dries, then the two dots are combined into a single dot having a larger diameter. When such combined dots have larger diameters, a user looking at a resulting image formed on the printing sheet may feel that the image has a portion where dots (grains) are conspicuous. That is, the accuracy of the dots is deteriorated. FIG. 10D shows how elliptical dots formed by a preceding main scan and elliptical dots formed by a current main scan are connected to each other. If dots are connected to each other in this manner, small dots are particularly deteriorated in appearance when combined into larger dots. This means a problem that a rough, grainy image is formed instead of an intended high-resolution image.

SUMMARY

A need has arisen to provide an image forming apparatus capable of reducing the degree of banding. Features described herein include a printer having a recording head, and configured to form a first plurality of rows of dots with a first scan of the recording head in a main scan direction; change a relative position between the recording head and recording medium so that, in the new position, a portion of the recording head overlaps, in an auxiliary scanning direction perpendicular to the main scanning direction, an area of the recording medium scanned by the first scan; and forming a second plurality of rows of dots with a second scan of the recording head in the main scan direction, wherein the first and second pluralities of rows extend in the main scanning direction, and wherein in an area of the recording medium overlapped by the scans, rows of the second plurality of rows lie between rows of the first plurality of rows.

The relative positions between the recording head and a recording medium may be accomplished by any means, such as transporting the recording medium in the auxiliary-scanning direction, and may be performed between the first and second scans (which may be successive).

The resulting dots (e.g., dots formed at dot positions) formed by the scans may be arranged in a uniform grid pattern for certain areas, and for other areas, the dots from the second scan may be offset (in the main scanning direction, the auxiliary scanning direction, or both) from the dots from the first scan. For example, the rows and columns may alternate. In those other areas, which may be at locations where transport errors are likely to be apparent, the dots may be generated at a higher resolution (e.g., having a greater row concentration).

The printer may also be configured to perform error diffusion when changing processing from a high resolution area to a low one (and vice versa), which may include converting image data to have different bit sizes, and applying coefficients to error data values to distribute errors among multiple pixels. Other features and aspects will be described below.

BRIEF DESCRIPTION OF THE DRAWINGS

Features herein will be described in detail with reference to the following figures wherein:

FIGS. 2A and 2B are schematic diagrams showing arrangements of dots formed on a printing medium; FIG. 2A shows an arrangement of dots that are formed normally and FIG. 2B shows an arrangement of dots that are formed when an error has occurred in an auxiliary scan;

FIG. 3A is a functional block diagram showing the error diffusion process and FIG. 3B illustrates rearrangement of errors stored in a low-resolution buffer or a high-resolution buffer;

FIG. 5A shows an arrangement of dots that are formed normally and FIG. 5B shows an arrangement of dots that are formed when an error has occurred in an auxiliary scan;

FIGS. 10A-10D are schematic diagrams showing dot arrangements of conventional techniques; FIG. 10A shows a state that banding has occurred due to an error in the transport direction, FIG. 10B is a dot arrangement illustrating a conventional method for reducing the degree of banding, FIG. 10C shows how the degree of banding is reduced when an error occurs in the transport direction, and FIG. 10D shows a problem of the conventional method for reducing the degree of banding.

DETAILED DESCRIPTION

Aspects described herein will be described in detail with reference to the accompanying drawings.

Figure 1:
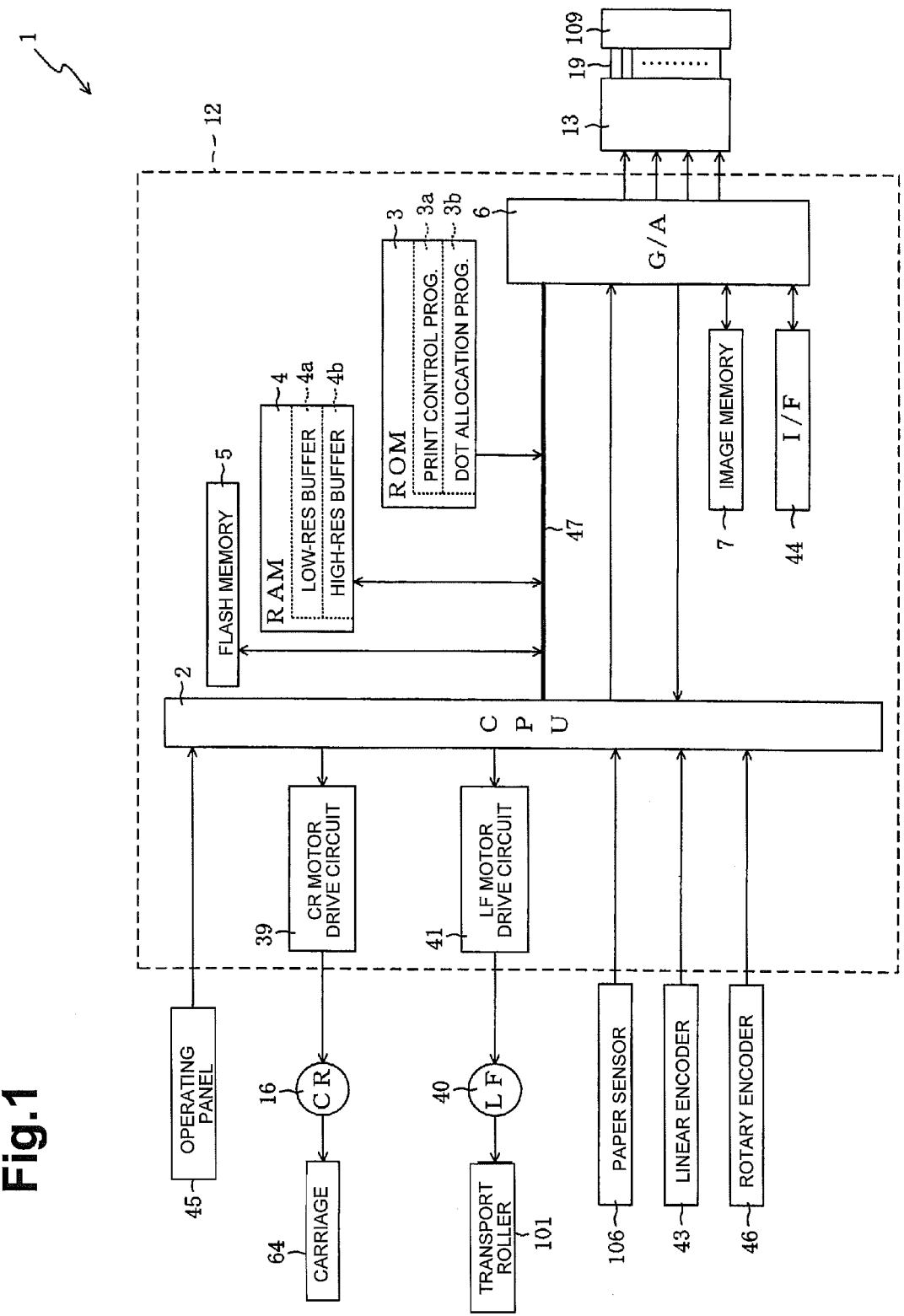
FIG. 1 is a block diagram schematically showing the electrical configuration of a printer as an image forming apparatus according to a first embodiment described herein.

A printer 1 as an image forming apparatus according to a first embodiment will be hereinafter described with reference the accompanying drawings. FIG. 1 is a block diagram schematically showing the electrical circuit configuration of the printer 1. The printer 1 may be an ink-jet printer which forms a color image by ejecting inks of plural colors to a printing medium (e.g., paper).

A controller for controlling the printer 1 may be equipped with a main-body-side control board 12 and a carriage board 13. The main-body-side control board 12 may be mounted with a central processing unit (CPU) 2, a read-only memory (ROM) 3 storing various control programs to be run by the CPU 2, a random-access memory (RAM) 4 which can be a memory storing various data etc. temporarily, a flash memory 5, an image memory 7, a gate array (G/A) 6, etc. These various storage components may be one or more computer-readable media, storing control programs and computer-executable instructions for performing the steps described herein.

The CPU 2 as a computing device may process input image data according to a control program stored in ROM 3, and may store resulting image data in the image memory 7. The CPU 2 may also generate a print timing signal, and may transfer individual signals to the gate array 6 (described later). The CPU 2 may also be connected to, and control, a variety of other components, such as an operating panel 45 through which a user makes a print instruction, a carriage (CR) motor drive circuit 39 for driving a carriage motor (CR motor) 16 for moving a carriage 64 mounted with an ink head 109 in a main scanning direction which crosses (is perpendicular to) a auxiliary-scanning direction, an line feed (LF) motor drive circuit 41 for operating a transport motor (LF motor) 40 for driving a transport roller 101 which transports a printing medium in the auxiliary-scanning direction, a paper sensor 106, a linear encoder 43, and a rotary encoder 46. The carriage motor drive circuit 39 and/or carriage motor 16 may be a main scanning unit. The line feed motor drive circuit 41 and/or the transport motor 40 may be an auxiliary scanning unit.

Buffers for temporarily storing errors that are generated at the time of error diffusion processing, to diffuse each error to nearby pixels may be formed in the RAM 4. When printing is performed on a printing medium by the ink head 109, there occur areas where dots are formed at a low resolution and areas where dots are formed at a high resolution. The RAM 4 may include a low-resolution buffer 4a for storing nearby-pixel errors in the case of low-resolution printing, and a high-resolution buffer 4b for storing nearby-pixel errors in the case of high-resolution printing.

The paper sensor 106 is a sensor for detecting presence/absence of a printing sheet (e.g., printing medium). The linear encoder 43 is a device for detecting a movement distance of the carriage 64. The reciprocation movement of the carriage 64 in the main scanning direction is controlled according to the movement distance detected by the linear encoder 43. The rotary encoder 46 is a device for detecting a rotation angle of the transport roller 101. The transport roller 101 is controlled according to the rotation angle detected by the rotary encoder 46.

A print control program 3a for performing print processing, a dot allocation program 3b for performing processing of arranging dot positions to reduce the degree of banding, and other programs may be stored in the ROM 3. Correction values to be used for transporting a printing sheet correctly and scanning the ink head 109 correctly and other values may be determined by a pre-shipment test and stored in the flash memory 5. The CPU 2, the ROM 3, the RAM 4, the flash memory 5, and the gate array 6 may be connected to each other via a bus line 47.

The gate array 6 accesses image data stored in the image memory 7, and transfers print data (drive signals) for printing a corresponding image on a printing sheet. The signals may be synchronized with a transfer clock of the carriage board 13 on the basis of a timing signal transferred from the CPU 2 and the image data. Furthermore, the gate array 6 may store, in the image memory 7, image data that is transferred from a personal computer, a digital camera, or the like via an interface (I/F) 44, such as a universal serial bus (USB) interface.

The carriage board 13 serves to apply voltages to piezoelectric actuators of the ink head 109. As a result of this action, ink droplets are ejected from the ink head 109 toward a printing medium.

Next, a description will be made of an arrangement of dots that are formed on a printing sheet by the printer 1 with reference to FIGS. 2A and 2B. Like FIGS. 10A-10D, FIGS. 2A and 2B are schematic diagrams showing discharge apertures of the ink head 109 and arrangements of dots that are formed on a printing sheet by the discharge apertures. In this example, the ink head 109 is formed with 100 discharge apertures (indicated by hatched circles) that are arranged in the auxiliary-scanning direction. The discharge apertures are assigned numbers 1 to 100 (the head discharge aperture is given the number 1). Dots formed on a printing sheet by a preceding main scan are indicated by white circles, and dots formed on the printing sheet by a current main scan are indicated by black circles. A head raster of a page is called raster No. 1 and the raster number increases in order toward the bottom of the page. These numbers that are assigned to respective rasters are numbers that are assigned when all rasters in the area concerned are formed at a raster interval of a high-resolution area (described later), and are numbers assigned for convenience to describe the operation of the embodiment.

Rasters are formed by a current main scan between rasters that were formed in part of an area where printing was performed by a preceding main scan, whereby that part of the area is increased in resolution (e.g., has more rasters in a predetermined vertical section, such as rasters per centimeter). In areas where printing is performed at a low resolution, rasters may be formed at positions corresponding to alternate raster numbers, such that printed and blank rasters alternate. In areas where printing is performed at a high resolution, rasters may be formed at positions corresponding to respective raster numbers, such that dots may be placed in all raster numbers of the area.

In FIGS. 2A and 2B, dots that are formed by two successive main scans (a preceding one and a current one) in a are shown aligned with the discharge apertures of the ink head 109 at the two positions corresponding to the preceding and current main scans, respectively.

FIG. 2A shows a case in which a printing sheet was transported without error in an auxiliary scan between the preceding main scan and the current main scan. FIG. 2B shows a case in which a printing sheet was transferred excessively (excess distance: $\Delta$) in an auxiliary scan that was performed between the preceding main scan and the current main scan.

As shown in FIG. 2A, a 193rd raster (indicated by white circles) is formed by the 97th discharge aperture of the ink head 109 in a main scan (preceding main scan) and no 194th raster is formed because the area from the first raster to the 195th raster is a low-resolution area.

One hundred ninety-fifth, 197th, and 199th rasters (indicated by white circles) are formed by the 98th, 99th, and 100th discharge apertures, respectively, during the preceding main scan. Then, the printing sheet is transported in the auxiliary-scanning direction by a distance that is a little shorter than the length of the ink head 109 (e.g., 97.5 times the interval between the discharge apertures). Then, a 196th raster is formed by the first discharge aperture between the 195th and 197th rasters that were formed by the 98th and 99th discharge apertures in the preceding main scan. A 198th raster is formed by the second discharge aperture between the 197th and 199th rasters that were formed by the 99th and 100th discharge apertures in the preceding main scan. A 200th raster is formed by the third discharge aperture.

Therefore, with d representing the pitch of the plural discharge apertures of the ink head 109, the interval of rasters formed on the printing sheet is equal to d in the area from the first raster to the 195th raster and is equal to d/2 in the area from the 195th raster to the 200th raster.

Therefore, the area (second area) between the $195^{th}$ and $200^{th}$ rasters is two times higher in the resolution in the auxiliary-scanning direction than other areas (first areas). Where the raster interval is decreased by increasing the resolution, even if a transport error occurs in the auxiliary-scanning direction in this area, the width of blank lines is small and hence banding is less prone to occur.

FIG. 2B illustrates the above situation. One hundred ninety-third, 195th, 197th and 199th rasters are formed by the 97th to 100th discharge apertures of the ink head 109, respectively, in a preceding main scan. Then, the printing sheet is transported in the auxiliary-scanning direction, but it is assumed that the printing sheet is transported excessively (excess distance: $\Delta$). As a result, the interval between the 195th and $196^{th}$ rasters becomes $d/2+\Delta$, and the interval between the $196^{th}$ and 197th rasters becomes $d/2-\Delta$. Likewise, the interval between the $197^{th}$ and $198^{th}$ rasters becomes $d/2+\Delta$, and the interval between the $198^{th}$ and 199th rasters becomes $d/2-\Delta$. In this manner, blank lines having a width $d/2+\Delta$ are formed when a deviation of $\Delta$ occurs in the auxiliary-scanning direction. However, since the width of the blank lines does not exceed d, the degree of banding can be reduced.

Rasters formed by a current main scan are located at different positions in the auxiliary-scanning direction than rasters formed by a preceding main scan. Therefore, even if dot positions are deviated in the main scanning direction, dots formed by the current main scan do not overlap with dots formed by the preceding main scan. This can minimize deterioration of the quality of the dots.

As described above with reference to FIGS. 2A and 2B, in part of an area that was formed by a preceding scan, rasters are formed by a current main scan so as to be interposed between rasters that were formed by the preceding main scan. Therefore, the resolution is high in the area where rasters are formed by the current main scan so as to be interposed between the rasters that were formed by the preceding main scan and is low in other areas. In the first embodiment, it is assumed that image data of printing dots is generated by an improved error diffusion method. The error diffusion method is a known method in which original image data composed of, for example, 8 bits (0 to 255), is converted into 1-bit data (two values) indicating whether to form a dot, or 2-bit data (four values) indicating whether the dot size should be large, medium, or small or none (blank), and any error produced by the conversion between the original image data and the converted data is distributed to nearby dots. The error diffusion method makes it possible to provide gradations without causing pseudo-outlines even in the case where the image gradation varies gradually.

Figure 3A:
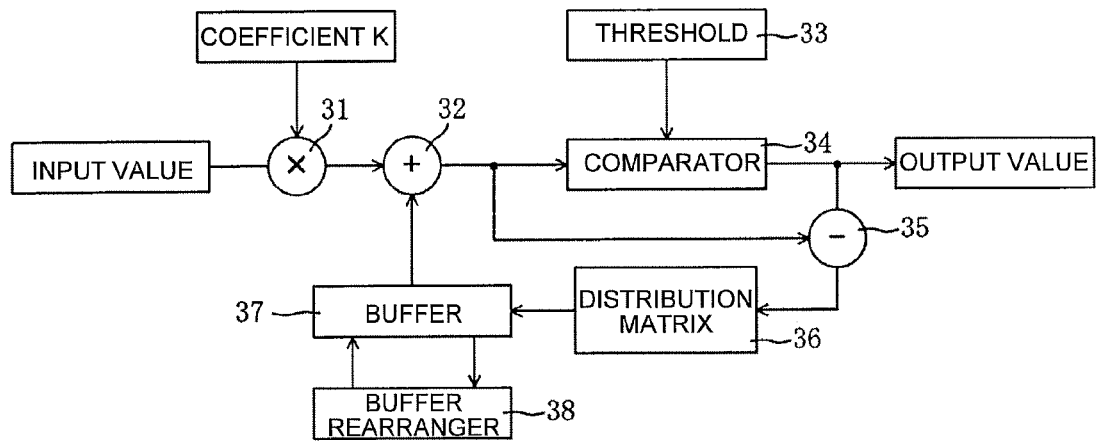
FIGS. 3A and 3B illustrate an error diffusion process.

Next, an allocation process for allocating a dot by the above-mentioned improved error diffusion method will be described with reference to FIGS. 3A and 3B and FIG. 4. FIG. 3A is a functional block diagram outlining an error diffusion process. FIG. 4 is a flowchart of the error diffusion process.

First, the error diffusion process of the first embodiment will be described with reference to FIGS. 3A and 3B. In this error diffusion process, to process a low-resolution area, the error diffusion process is executed while errors are stored in the low-resolution buffer 4a which is used for distributing each error to nearby pixels. To process a high-resolution area, the error diffusion process is executed while errors are stored in the high-resolution buffer 4b which is used for distributing each error to nearby pixels. When switching is made from a low-resolution area to a high-resolution area, or from a high-resolution area to a low-resolution area, processing of rearranging errors of nearby dots stored in the low-resolution buffer 4a or the high-resolution buffer 4b is performed.

In the error diffusion process, first, a multiplier 31 multiplies input image data (e.g., 8-bit data) by a coefficient K. The coefficient K is set at "1" in processing a low-resolution area and at $1/X^2$ in processing a high-resolution area, where X is the ratio of the high-resolution to the low-resolution. For example, where the high-resolution/low-resolution ratio is equal to 2 as in the case of FIGS. 2A and 2B, K is set at 1/4.

After the input image data is multiplied by the coefficient K by the multiplier 31, an error that is assigned to the dot position of the image data is read from an error buffer 37 and added to the multiplied image data by an adder 32. A resulting addition value is compared with a preset threshold value 33 by a comparator 34. An output value that is determined by the comparison is output. The difference between the output value and the addition value of the adder 32 is calculated as an error by the subtractor 35. The error is distributed to nearby dots by a preset distribution matrix. Nearby-dot errors for distribution are added to errors that are stored in the error buffer 37 as corresponding to the positions of the nearby dots. The errors are thus updated.

The error buffer 37 is composed of the low-resolution buffer 4a and the high-resolution buffer 4b. When switching is made from a low-resolution area to a high-resolution area or from a high-resolution area to a low-resolution area, error rearrangement processing is performed by a buffer rearranger 38. In the above-mentioned case that the high-resolution/low-resolution ratio is equal to 2, an error of one dot of a low-resolution area corresponds to divisional errors of four dots of a high-resolution area.

Figure 3B:
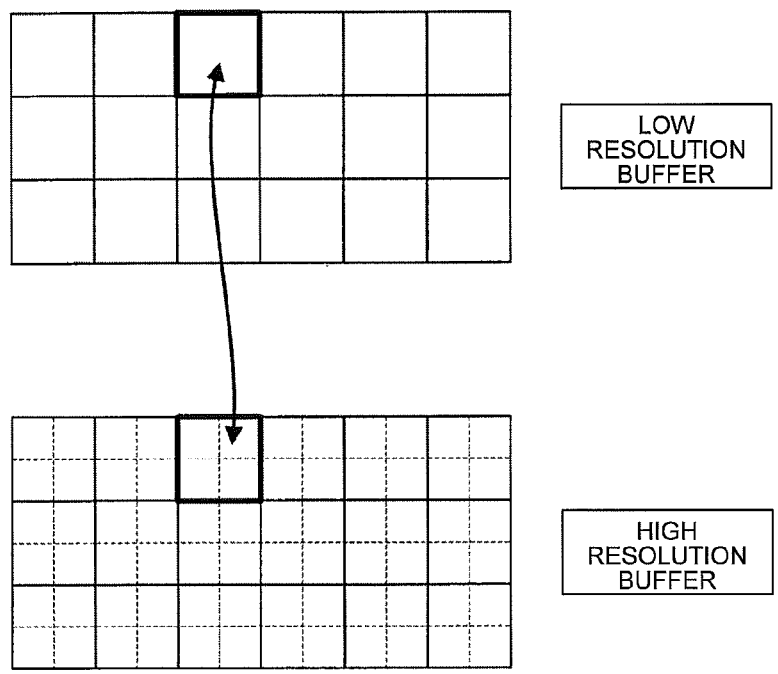
Figure 4:
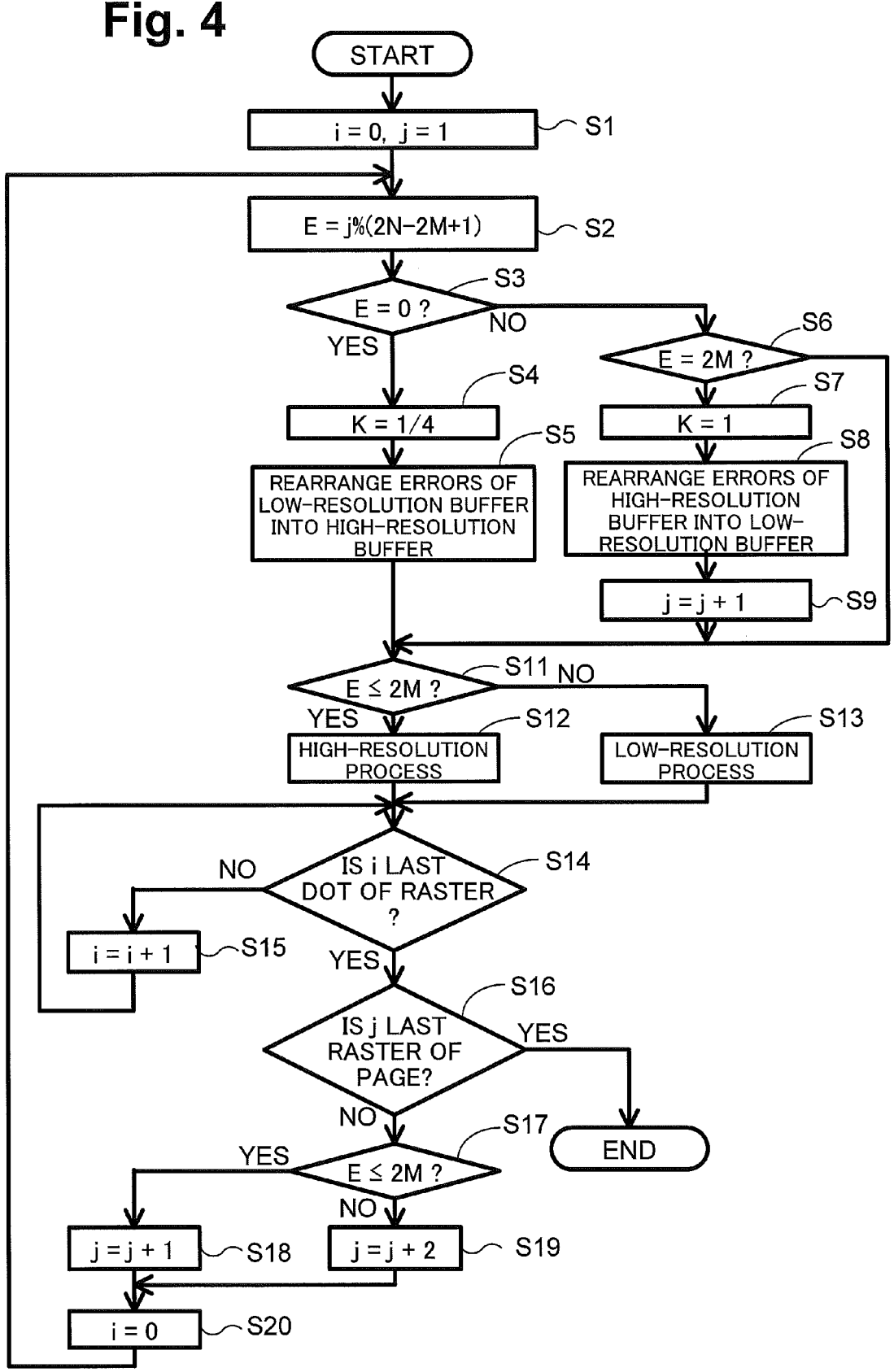
FIG. 4 is a flowchart of a dot allocation process according to a first embodiment described herein.

FIG. 3B schematically shows the low-resolution buffer 4a and the high-resolution buffer 4b. The two buffers store error data corresponding to the same region of the image, but at different levels of resolution. In this example, the image has a number of regions (e.g., dots) at low resolution, and those regions are sub-divided into four smaller regions for the high resolution version. The four sub-regions may be obtained by equally dividing, in each of the main scanning direction and the auxiliary-scanning direction, a region corresponding to one dot of the low-resolution buffer 4a correspond to four respective dots of the high-resolution buffer 4b.

Therefore, as shown in FIG. 3B, when switching is made from a low-resolution area to a high-resolution area, an error of one dot that is stored in the low-resolution buffer 4a can be multiplied by ¼, and a resulting value can be stored for the four corresponding regions of the high-resolution buffer 4b.

On the other hand, when switching is made from a high-resolution area to a low-resolution area, errors of four dots stored in the high-resolution buffer 4b may be added together, and a resulting value can be stored in the low-resolution buffer 4a as an error of the corresponding one dot. Rearranging errors in this manner makes it possible to reduce the degree of pseudo-outlines because the error diffusion process is executed uniformly even if the resolution is changed.

Next, a dot allocation process which can be executed by the CPU 2 will be described with reference to FIG. 4. The dot allocation process may be a process that is executed by the dot allocation program 3b, which can be stored in the ROM 3. FIG. 4 is a flowchart of the dot allocation process. In this dot allocation process, i is a variable that indicates a dot that is an element of a raster, j is a variable that indicates a raster, N is the number of discharge apertures, arranged in the auxiliary-scanning direction, of the ink head 109, and M is the number of discharge apertures that are used for printing in a high-resolution area among the N discharge apertures.

As in the case of FIGS. 2A and 2B, raster numbers are assigned so as to increase in order toward the bottom of a page and the head raster of the page is given a raster number 1 (j=1). In a low-resolution area, rasters are formed at positions corresponding to alternate raster numbers. In a high-resolution area, rasters are formed at positions corresponding to consecutive raster numbers.

When a head portion of a printing sheet is subjected to a main scan, low-resolution printing is performed from a first raster to a (2N−2M−1)th raster. In an area of 2M rasters starting from a (2N−2M)th raster, high-resolution printing is completed with the next main scan after an auxiliary scan that corresponds to (2N−2M+1) rasters. Subsequently, printing is performed while a low-resolution area and a high-resolution area are formed repeatedly in a cycle of (2N−2M+1) which corresponds to a auxiliary-scanning amount. In FIG. 4, symbol "%" denotes an operator that determines a remainder of division by its argument. In the example of FIGS. 2A and 2B, N and M are equal to 100 and 3, respectively.

In the dot allocation process, first, at step S1, variable i which indicates a dot of a raster is set at 0 and variable j which indicates the raster is set at 1. At step S2, a remainder E of division of variable j by the auxiliary-scanning amount (2N−2M+1) is calculated. At step S3, it is judged whether the remainder E is equal to 0. If the remainder E is equal to 0 (S3: yes), switching should be made from processing for a low-resolution area to processing for a high-resolution area in the error diffusion process. Therefore, the coefficient K is set to 1/4 at step S4 and errors stored in the low-resolution buffer 4a are rearranged and resulting errors are stored in the high-resolution buffer 4b at step S5.

If the remainder E is not equal to 0 (S3: no), it is judged at step S6 whether the remainder E is equal to 2M. If the remainder E is equal to 2M (S6: yes), switching should be made from processing for a high-resolution region to processing for a low-resolution region. Therefore, the coefficient K is set to 1 at step S7 and errors stored in the high-resolution buffer 4b are rearranged and resulting errors are stored in the low-resolution buffer 4a at step S8. To make switching to processing for a low-resolution process, at step S9 the raster number j is incremented by 1 as processing for raster position adjustment.

If it is judged at step S6 that the remainder E is not equal to 2M (S6: no) or if step S5 or S9 has been executed, it is judged at step S11 whether the remainder E is smaller than or equal to 2M. If the remainder E is smaller than or equal to 2M (S11: yes), the current area is a high-resolution area and the coefficient K by which image data is to be multiplied by the multiplier 31 should be 1/4. At step S12, an error diffusion process is executed by using the errors stored in the high-resolution buffer 4b. On the other hand, if the remainder E is larger than 2M (S11: no), the current area is a low-resolution area and the coefficient K by which image data is to be multiplied by the multiplier 31 should be 1. At step S13, an error diffusion process is executed by using the errors stored in the low-resolution buffer 4a.

If step S12 or S13 has been executed, it is judged at step S14 whether variable i indicates the last dot of the raster being processed. If variable i does not indicate the last dot of the raster being processed (S14: no), variable i is incremented by 1 at step S15 and the process returns to step S11. If variable i indicates the last dot of the raster being processed (S14: yes), it is judged at step S16 whether variable j indicates the last raster of the page being processed. If variable j does not indicate the last raster of the page being processed (S16: no), it is judged at step S17 whether the remainder E is smaller than or equal to 2M. If the remainder E is smaller than or equal to 2M (S17: yes), which means that the current area is a high-resolution area, variable j is incremented by 1 at step S18. If the remainder E is larger than 2M (S17: no), which means that the current area is a low-resolution area, variable j is incremented by 2 at step S19.

If step S18 or S19 has been executed, variable i is changed to 0 at step S20 and the process returns to step S2. If variable j indicates the last raster (S16: yes), the dot allocation process is finished. In the flowchart of FIG. 4, for the sake of simplicity, even in a head portion of a page a remainder E is calculated and processing suitable for the value of the remainder E is performed. However, since in a non-overlapping raster portion of a page printing is necessarily performed at a low resolution, the flowchart may be modified so that the low-resolution error diffusion process of step S13 is executed if variable j is smaller than 2M.

As described above, in the first embodiment, rasters are formed by a current main scan between rasters in part of an area where printing was performed by a preceding main scan, whereby the resolution of that part of the area is made higher than the resolution of other areas. This makes it possible to reduce the degree of banding and to lower the probability that dots formed by a current main scan overlap with dots that were formed by a preceding main scan. Since dot diameters are not increased, a user does not find grain-conspicuous portions in an image formed on a printing sheet. That is, the first embodiment can minimize deterioration of quality.

When switching is made between a low-resolution area and a high-resolution area in performing error diffusion processing on image data, errors stored in the error buffer are rearranged according to a change in resolution. This makes it possible to form a natural image that is free of pseudo-outlines.

Next, a second embodiment will be described. In the first embodiment, in a lower end portion of an area where printing was performed by a preceding main scan, rasters are formed by a current main scan so as to be interposed between rasters that were formed by the preceding main scan. And the positions, in the main scanning direction, of dots formed by the current main scan are made the same as those of dots that were formed by the preceding main scan. In contrast, in the second embodiment, in a high-resolution area, each raster is divided into plural sections and the sections are disposed so that adjoining sections are deviated from each other in the auxiliary-scanning direction. More specifically, sections are located alternately in one raster and the next raster. The second embodiment is different from the first embodiment in the dot arrangement method, and has the same electrical configuration as shown in FIG. 1.

Figure 5A:
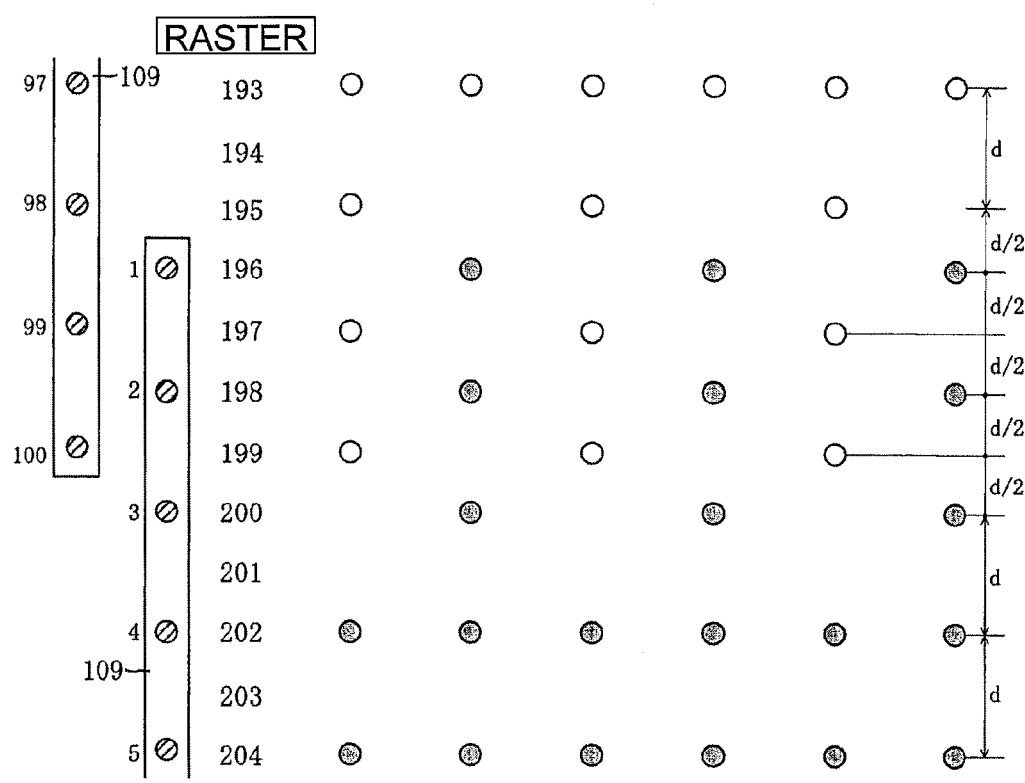
FIGS. 5A and 5B are schematic diagrams showing dot arrangements according to a second embodiment described herein.
Figure 5B:
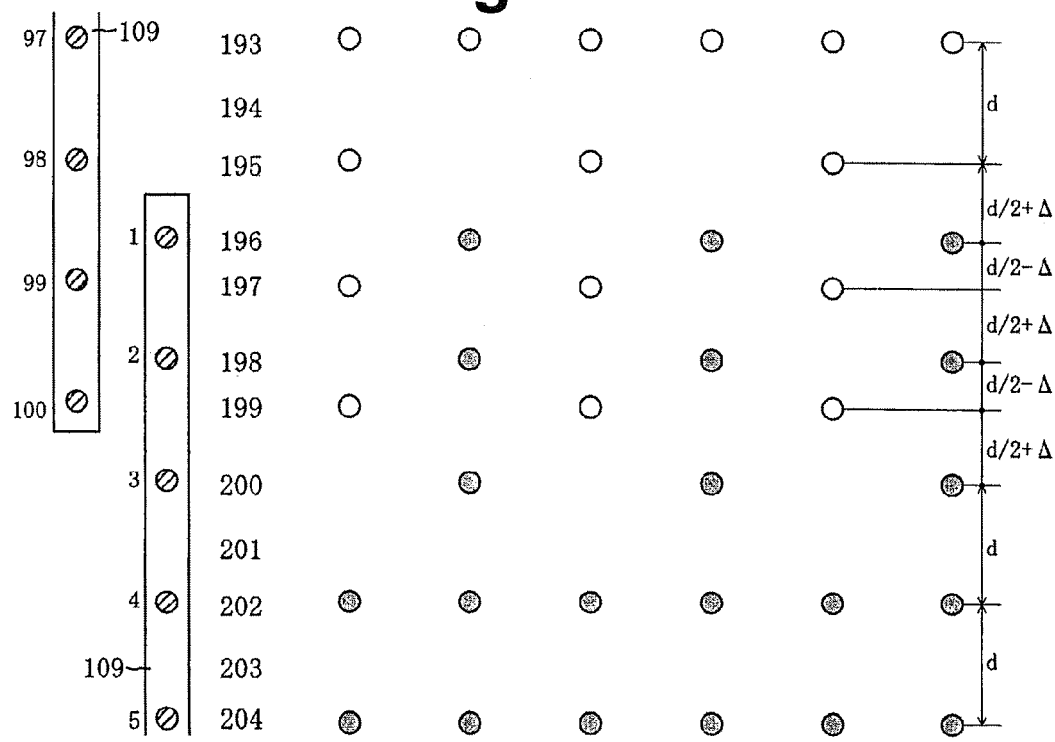

FIGS. 5A and 5B are schematic diagrams showing dot arrangements according to the second embodiment. In the example of FIGS. 5A and 5B, as in the case of FIGS. 2A and 2B, the ink head 109 is formed with 100 discharge apertures that are arranged in the auxiliary-scanning direction. Dots formed by a preceding main scan are indicated by white circles and dots formed by a current main scan are indicated by black circles. Raster numbers are assigned in the same manner as in the first embodiment; the head raster of a page is called raster No. 1 and the raster number increases in order toward the bottom of the page.

FIG. 5A shows a dot arrangement that is obtained in a case that no transport error has occurred in the auxiliary-scanning direction. FIG. 5B shows a dot arrangement that is obtained in a case that a transport error A has occurred in the auxiliary-scanning direction.

As shown in FIG. 5A, a 193rd raster is formed by the 97th discharge aperture of the ink head 109 in a preceding main scan. Although not shown in FIG. 5A, odd-numbered ones of first to 191st rasters are formed by the first to 96th discharge apertures during that preceding main scan. In each of these rasters, a dot is formed in every column (e.g., a row of dot positions that are arranged in the auxiliary-scanning direction). On the other hand, 195th, 197th, and 199th rasters are formed by the 98th, 99th, and 100th discharge apertures, respectively, and the dot interval, in the main scanning direction, of each of these rasters is two times that of the 193rd raster. In other words, the dots of each of the 195th, 197th, and 199th rasters are located in alternate columns.

In the next main scan (current main scan), 196th, 198th, and 200th rasters are formed by the first, second, and third discharge apertures, respectively. In each of these rasters, dots are formed in columns that lie between the alternate columns of the $195^{th}$, $197^{th}$ and $199^{th}$ rasters in the main scanning direction, that is, in the columns where no dots of the 195th raster are formed.

Attention is now paid to the 195th raster and the 196th raster. In the 195th raster, the dots are formed in alternate columns. In the 196th raster, the dots are formed in the columns where no dots of the 195th raster are formed. The dots in the area of these rasters alternate in both the main scanning direction (rasters) and the auxiliary scanning direction (columns), forming a checkerboard pattern. Stated in a different way, when the 195th raster is divided into the individual dots, these dots are formed in the alternate columns. The dots of the 196th raster which is deviated from the 195th raster in the auxiliary-scanning direction are formed in the remaining columns.

In this embodiment, each raster is divided into individual dots and the dots formed in alternate columns of one of two adjoining rasters are deviated in the auxiliary-scanning direction from the dots formed in alternate columns of the other of the adjoining rasters. Another dot arrangement method is possible in which each raster is divided into sets of two or three dots and the sets of dots of one of two adjoining rasters are deviated in the auxiliary-scanning direction from the sets of dots of the other of the adjoining rasters. In other words, the alternating pattern of dots in the $195^{th}$ raster of FIG. 5A has dots alternating with blanks (gaps) on a one-to-one ratio, but an alternative arrangement has the dots alternating at a different ratio, such as having two or three dots separated by a corresponding two or three-dot gap, with the $196^{th}$ raster having dots in the columns that were blank in the $195^{th}$ raster.

Since as described above the dots in an area where the resolution in the auxiliary-scanning direction is increased are arranged in checkered form, the interval between the 195th to 200th rasters is d/2, where d is the interval between the first to 195th rasters. As also illustrated in FIG. 5A, the non-overlapping portions (e.g., rasters 193, 202, 204) have dots formed in a uniform grid-type pattern, as compared to the checkered pattern of rasters 195-200.

FIG. 5B shows an arrangement of dots that are formed in a case that a printing sheet was transferred excessively (excess distance: Δ) in an auxiliary scan that was performed between a preceding main scan and a current main scan.

A 195th raster is formed by the 98th discharge aperture in a preceding main scan, and a 196th raster is formed by the first discharge aperture in the next main scan (current main scan). The interval between these rasters is d/2+Δ. A 197th raster is formed by the 99th discharge aperture in the preceding main scan and the 196th raster is formed by the first discharge aperture in the current main scan. The interval between these rasters is d/2−Δ. Likewise, the interval between the 197th raster formed by the 99th discharge aperture in the preceding main scan and a 198th raster formed by the second discharge aperture in the current main scan is d/2+Δ. The interval between a 199th raster formed by the 100th discharge aperture in the preceding main scan and the 198th raster formed by the second discharge aperture in the current main scan is d/2−Δ. Therefore, blank lines having a width d/2+Δ are formed when a deviation of Δ occurs in the auxiliary-scanning direction. However, since the width of blank lines does not exceed d, the degree of banding can be reduced.

Therefore, as in the first embodiment, since rasters of a current main scan are formed between rasters of part of an area where printing was performed by a preceding main scan, in that part of the area the resolution in the auxiliary-scanning direction is made two times that in other areas. The degree of banding can be reduced even if a transport error occurs. Even if an error occurs in the main scanning direction in that part of the area, since the position, in the auxiliary-scanning direction, of dots formed by a preceding main scan is different from that of dots formed by a current main scan, the dots do not overlap with each other and hence the graininess is not deteriorated.

Figure 6:
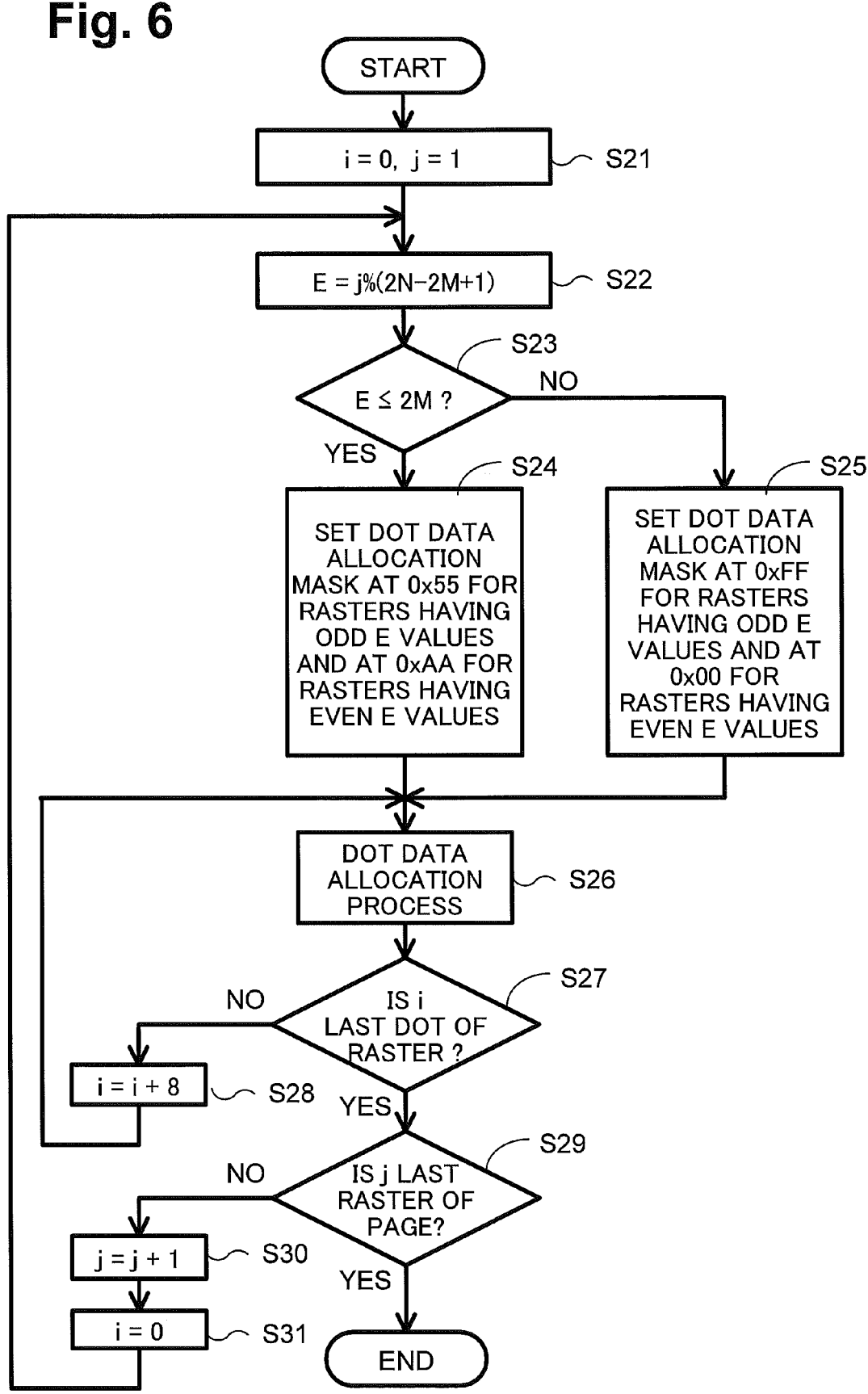
FIG. 6 is a flowchart of a dot allocation process according to the second embodiment.

Next, a dot allocation process according to the second embodiment which is executed by the CPU 2 will be described with reference to FIG. 6. FIG. 6 is a flowchart of a dot allocation process for allocating dots so as to produce the dot arrangement of FIGS. 5A and 5B. In this dot allocation process, as in the first embodiment, i is a variable that indicates a dot that is an element of a raster, j is a variable that indicates a raster, N is the number of discharge apertures, arranged in the auxiliary-scanning direction, of the ink head 109, and M is the number of discharge apertures that are used for printing in a high-resolution area among the N discharge apertures.

When a head portion of the printing sheet is subjected to main scans, a first raster to (2N−2M−1)th raster are formed at a low-resolution and 2M rasters starting from a (2N−2M)th raster are formed at a high resolution (i.e., dots of each raster are formed in alternate columns, that is, dots are arranged in checkered form). Subsequently, printing is performed while a low-resolution area and a high-resolution area are formed repeatedly in a cycle of (2N−2M+1).

In the dot allocation process, first, at step S21, variable i which indicates a dot of a raster is set at 0 and variable j which indicates the raster is set at 1. At step S22, a remainder E of division of variable j by the auxiliary-scanning amount (2N−2M+1) is calculated. If the remainder E is smaller than or equal to 2M (S23: yes), the current area is a high-resolution area. At step S24, an allocation mask to be applied to dot data of rasters whose remainders E are odd numbers is set at 0x55 ("0x" means a hexadecimal number; this also applies to the following description) and an allocation mask to be applied to dot data of rasters whose remainders E are even numbers is set at 0xAA.

On the other hand, if the remainder E is larger than 2M (S23: no), at step S25 the allocation mask to be applied to dot data of rasters whose remainders E are odd numbers is set at 0xFF and the allocation mask to be applied to dot data of rasters whose remainders E are even numbers is set at 0x00. At steps S22-S25, for the sake of simplicity, even in a head portion of a page a remainder E is calculated and processing suitable for the value of the remainder E is performed. However, since in a head portion of a page printing is necessarily performed at a low resolution, the flowchart may be modified so that step S25 is executed if variable j is smaller than 2M.

When step S24 or S25 has been executed, at step S26 read-out 8-bit dot data (print data) is multiplied by the thus-set allocation mask and resulting print data is stored in the image memory 7. At step S27, it is judged whether variable i indicates the last dot of the raster. If there remains an unprocessed dot(s) (S27: no), variable i is incremented by 8 at step S28 and the process returns to step S26 to read the next 8-bit data to be used for forming the raster. If variable i indicates the last dot of the raster (S27: yes), it is judged at step S29 whether variable j indicates the last raster of the page. If variable j does not indicate the last raster of the page (S29: no), variable j is incremented by 1 at step S30, variable i is set to 0 at step S31, and the process returns to step S22 to perform processing for the next raster. If variable j indicates the last raster of the page (S29: yes), which means that processing for all rasters of the page has completed, the dot allocation process is finished.

As described above, in the second embodiment, a high-resolution area is formed, that includes an overlap area of an area that was formed by a preceding main scan and an area that is formed by a current main scan. In the high-resolution area, dots that were formed by the preceding main scan and dots that are formed by the current main scan are located at different positions in the printing sheet transport direction (auxiliary-scanning direction), that is, they are arranged in checkered form. This makes it possible to reduce the degree of banding because no straight blank lines are formed even if an error occurs in the transport direction. Furthermore, even if an error occurs in the main scanning direction between a preceding main scan and a current main scan, since dot positions are different in the auxiliary-scanning direction, the probability that dots formed by the current main scan overlap with dots that were formed by the preceding main scan to form large dots is low. Therefore, the quality of dots is not deteriorated.

Next, a third embodiment will be described. In the second embodiment, rasters of a current main scan by the ink head 109 are formed between rasters that were formed by a preceding main scan, whereby a high-resolution area is formed in part of an area that was formed by the preceding main scan. In the high-resolution area, the resolution in the auxiliary-scanning direction is higher than in other areas. In contrast, in the third embodiment, which is directed to interlaced printing and has been conceived to reduce the degree of banding when a printing sheet is flipped by the transport roller 101 to cause a transport skip, dots are arranged in checkered form as shown in FIGS. 5A and 5B in an area where a transport skip may occur.

Figure 7:
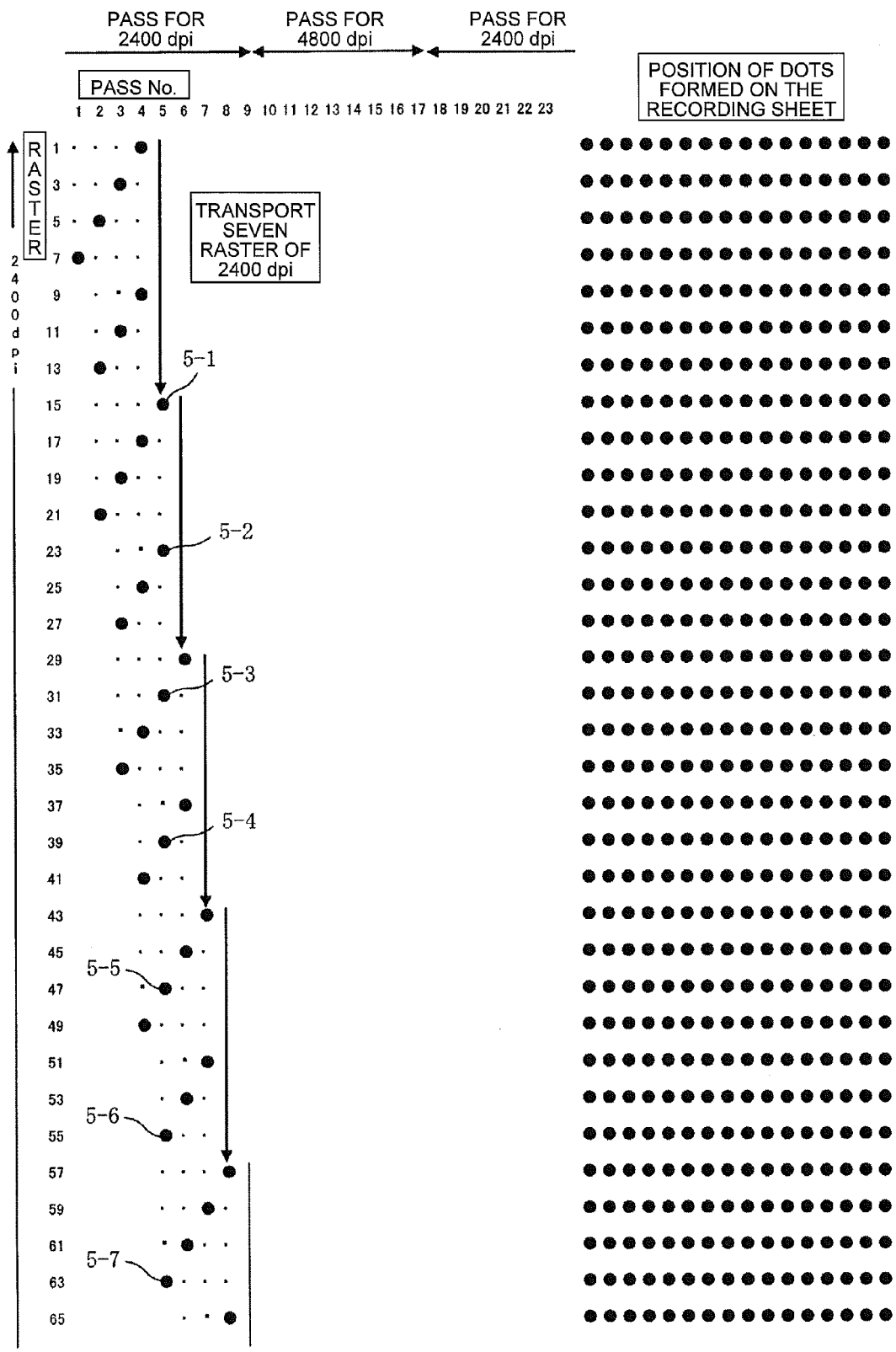
FIGS. 7 and 8 show a dot arrangement according to a third embodiment described herein.
Figure 8:
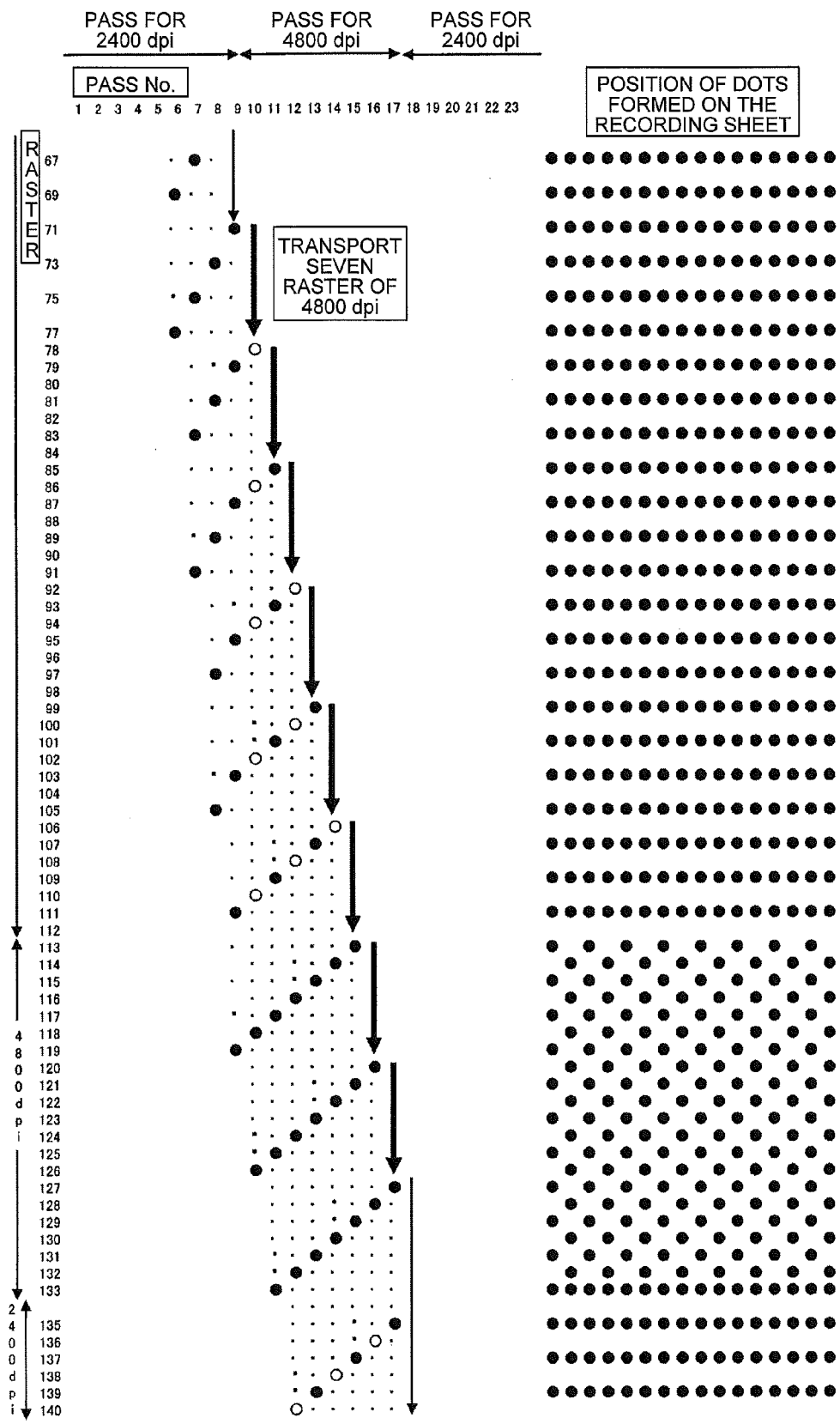

Next, a method for allocating dots that are formed by an interlace method will be described with reference to FIGS. 7 and 8. FIGS. 7 and 8 show how areas where dots are formed at a print resolution of 2,400 dpi and areas where dots are formed at a print resolution of 4,800 dpi are produced as rasters are formed sequentially. Dots are formed by the interlace method from a first raster shown in FIG. 7 in the direction in which the raster number increases in order. A 67th raster that is the first raster in FIG. 8 immediately follows a 65th raster that is the last raster in FIG. 7. The raster numbers are row numbers that are assigned to rasters (each of which is a line of dots that are formed as the ink head 109 is moved in the main scanning direction) in the direction from the top to the bottom of a printing sheet. In FIGS. 7 and 8, a head portion of the printing sheet is omitted and hence the first raster shown is actually a raster that is located at a certain halfway position.

Pass numbers (Pass Nos.) shown above the first raster indicate order of transport of a printing sheet. A black circle shown at the intersection of a pass number column and a raster row means that dots are formed by the pass concerned. A small point means that dots are not formed by the pass concerned. FIGS. 7 and 8 thus show how rasters are formed as the pass number increases.

For example, in FIG. 7, seven rasters, that is, a 15th raster indicated by a black circle 5-1, a 23rd raster indicated by a black circle 5-2, a 31st raster indicated by a black circle 5-3, a 39th raster indicated by a black circle 5-4, a 47th raster indicated by a black circle 5-5, a 55th raster indicated by a black circle 5-6, and a 63rd raster indicated by a black circle 5-7, are formed at the same time by pass No. 5. Likewise, 29th, 37th, 45th, 53rd, and 61st rasters and a 69th raster (see FIG. 8) are formed by pass No. 6.

As indicated by downward arrows, every time one pass is completed, the printing sheet is transported by an amount corresponding to seven rasters in the direction opposite to the direction of the arrows. Dots are formed as the printing sheet is transported successively in this manner.

Only odd-numbered rasters are formed in an area of the resolution 2,400 dpi. On the right side of FIGS. 7 and 8, lines of dots that are formed on the printing sheet are shown so as to correspond to the respective rasters.

As shown in FIG. 8, the resolution is set at 4,800 dpi and dots are arranged in checkered form only in the area of a 113th raster to a 132nd raster. This is because a transport (feed) skip may occur only while printing is performed in this area. With this measure, the degree of banding occurring in an image formed can be reduced even if a transport (feed) skip occurs.

The passes for the printing in the checked area are pass No. 10 to pass No. 17. In these passes, the transport amount is made a half of that of the case of 2,400 dpi, whereby a resolution 4,800 dpi is attained. Even-numbered rasters are formed by each even-numbered pass and odd-numbered rasters are formed by each odd-numbered pass. For example, dots of a 188th raster and a 126th raster are formed by pass No. 10 and dots of a 117th raster, a 125th raster, and a 138th raster are formed by pass No. 11. The dots of the even-numbered rasters are deviated in the transport direction from the dots of the odd-numbered rasters. In the area following the checkered area, rasters are formed at the original resolution of 2,400 dpi.

Figure 9:
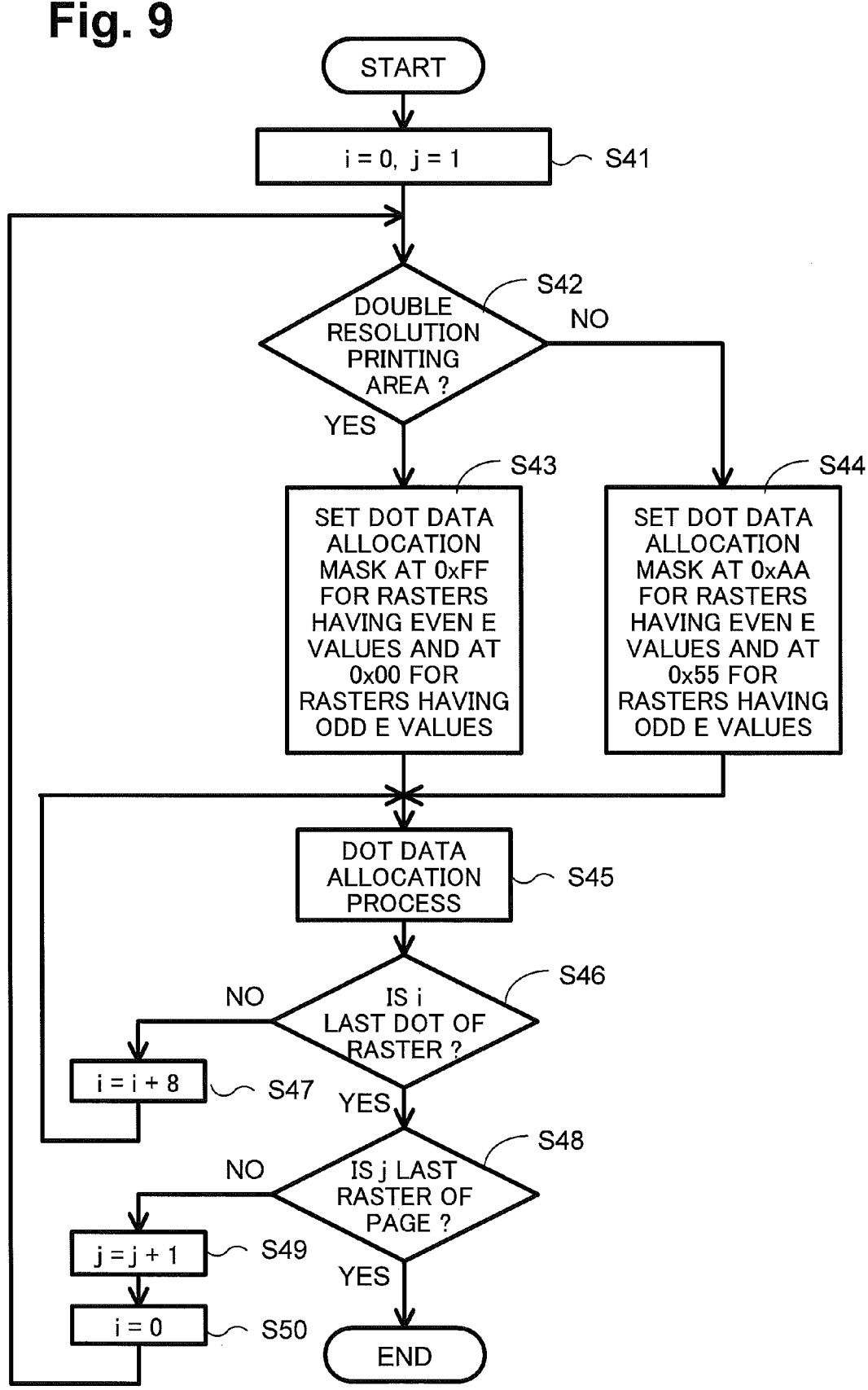
FIG. 9 is a flowchart of a dot allocation process according to the third embodiment.

Next, a process that may be executed by the CPU 32 by using the dot allocation program 33b will be described with reference to FIG. 9. FIG. 9 is a flowchart of a process which may be executed by using the dot allocation program 33b. This dot allocation process is such that print data for the resolution 2,400 dpi is input and converted for a checkered dot arrangement in an area where printing should be performed at a double resolution. This process is described in an example for one printing sheet. Where printing is performed on plural printing sheets, this process can be executed plural times.

First, at step S41, variable i which indicates the position, in the main scanning direction, of a dot of a raster is set at 0 and variable j which indicates the position, in the transport direction, of the raster is set at 0. At step S42, 8-bit data of input print data is read in and it is judged whether the raster of the 8-bit data belongs to an area where printing should be performed at the double resolution. In this embodiment, information indicating for what rasters printing should be performed at the double resolution is stored in the ROM 33 in advance and whether to print read-in data at the double resolution is judged on the basis of that information.

If the print data should be printed at the normal resolution rather than the double resolution (S42: no), at step S43 an allocation mask to be applied to even-numbered rasters is set at 0xFF and an allocation mask to be applied to odd-numbered rasters is set at 0x00. Therefore, dots are allocated so that a dot is formed in every column of each even-numbered raster and a dot is not formed in any column of each odd-numbered raster. Although in FIGS. 7 and 8 the first raster is given the raster number 1, this raster corresponds to variable j being equal to 0. In the flowchart of FIG. 9, the terms "even number" and "odd number" are used in an opposite manner to the manner they are used in FIGS. 7 and 8.

On the other hand, if the print data is to be printed at the double resolution (S42: yes), at step S44 the allocation mask to be applied to even-numbered rasters is set at 0xAA and the allocation mask to be applied to odd-numbered rasters is set at 0x55. Therefore, dots are allocated so that dots are formed in even-numbered columns but not in odd-numbered columns of each even-numbered raster, and dots are formed in odd-numbered columns but not in even-numbered columns of each odd-numbered raster.

When step S43 or S44 has been executed, at step S45 the print data is multiplied by the thus-set allocation masks and resulting print data is stored in the image memory 7. At step S46, it is judged whether variable i indicates the last dot of the raster. If variable i does not indicate the last dot of the raster (S46: no), variable i is incremented by 8 at step S47 and the process returns to step S45 to read the next 8-bit data to be used for forming the raster and convert it. If variable i indicates the last dot of the raster (S46: yes), it is judged at step S48 whether variable j indicates the last raster of the page. If variable j does not indicate the last raster of the page (S48: no), variable j is incremented by 1 at step S49, the variable i is set to 0 at step S50, and the process returns to step S42 to perform processing for the next raster. If variable j indicates the last raster of the page (S48: yes), which means that processing for all rasters of the page has completed, the dot allocation process is finished.

As described above, in the third embodiment, in a printing area where a transport (feed) skip may occur, the resolution in the printing sheet transport direction is increased and dots are arranged in checkered form. This makes it possible to reduce the degree of banding (e.g., white streaks) even if a transport (feed) skip occurs and to thereby enable high-quality printing.

Although the features above have been described by means of the embodiments, the present patent is not limited to the above embodiments and various improvements and modifications are possible without departing from the spirit and scope of that described herein.

For example, although the above embodiments are directed to the process of the printer 1, the features can also be applied to a process of a multifunction peripheral apparatus, a facsimile apparatus, or the like.

Although in the above embodiments the printing medium on which printing is performed is a printing sheet (paper), the printing medium is not limited to paper and may be a cloth, a vinyl member, or the like.

While the various aspects of the disclosure have been described in conjunction with the illustrative embodiments outlined above, various alternatives, modifications, variations, improvements and/or substantial equivalents may become apparent to those having at least ordinary skill in the art. Accordingly, the illustrative embodiments of the disclosure, as set forth above, are intended to be illustrative, not limiting. Various changes may be made without departing from the spirit and scope of the disclosure. Therefore, the disclosure is intended to embrace all known or later developed alternatives, modifications, variations, improvements and/or substantial equivalents.

What is claimed is:

1. One or more non-transitory computer-readable media, storing computer-executable instructions for: forming a first plurality of rows of dots with a first scan of a recording head in a main scanning direction;
   changing a relative position between the recording head and a recording medium so that, in the new position, a portion of the recording head overlaps, in an auxiliary scanning direction perpendicular to the main scanning direction, an area of the recording medium scanned by the first scan; and
   forming a second plurality of rows of dots with a second scan of the recording head in the main scanning direction, wherein the first and second pluralities of rows extend in the main scan direction, and wherein in an area of the recording medium overlapped by the scans, rows of the second plurality of rows lie between rows of the first plurality of rows.

2. The one or more computer-readable media according to claim 1, wherein the instructions for changing a relative position between the recording head and recording medium include instructions for transporting the recording medium in the auxiliary-scanning direction.

3. The one or more computer-readable media according to claim 1, wherein the instructions for changing a relative position between the recording head and recording medium include instructions for changing the relative position after the first scan, and before the second scan.

4. The one or more computer-readable media according to claim 1, further comprising instructions for performing the first and second scans successively.

5. The one or more computer-readable media according to claim 1, wherein the instructions for forming the second plurality of rows of dots include instructions to cause dots to be formed in the second scan at different positions in the auxiliary-scanning and main-scanning directions from positions of dots formed by the first scan.

6. The one or more computer-readable media according to claim 1, wherein rows formed by the overlapping scans form a pattern that alternates in the auxiliary scanning direction.

7. The one or more computer-readable media according to claim 1, wherein in the overlapping area, columns of dots formed by the overlapping scans form a pattern that alternates in the main scanning direction.

8. The one or more computer-readable media according to claim 1, wherein in the overlapping area, rows and columns of dots formed by the overlapping scans form a pattern that alternates in both the auxiliary scanning direction and main scanning direction.

9. The one or more computer-readable media according to claim 1, further storing computer-executable instructions for: converting original image data corresponding to a dot into converted image data having a smaller number of bits than the number of bits of the original image data;
   storing error data corresponding to errors between the original image data and the converted image data in a storing unit;
   multiplying the original image data by a coefficient corresponding to a resolution; and
   when switching is made from processing for a non-overlapped portion of the recording medium to processing for an overlapped portion of the recording medium, dividing an error stored in the storing unit as corresponding to one nearby pixel into errors corresponding to nearby pixels of a number that is equal to a reciprocal of a ratio between multiplication coefficients of the multiplying unit, and, when switching is made from processing for the overlapped portion to processing for the non-overlapped portion, adding together errors stored in the storing unit as corresponding to nearby pixels of the number that is equal to the reciprocal of the ratio between the multiplication coefficients of the multiplying unit into an error corresponding to one nearby pixel.

10. The one or more computer-readable media according to claim 1, further storing computer-executable instructions for diffusing error data from a resolution of the non-overlapped area to a higher resolution of the overlapped area.

11. The one or more computer-readable media according to claim 1, wherein a resolution of the overlapped area of the recording medium is a number of rows of dots in a predetermined vertical area of the recording medium, and is higher than a resolution of a non-overlapped area.

12. An image forming apparatus comprising: a recording head configured to eject droplets toward a recording medium; a first scanning unit configured to move the recording head in a first direction relative to the recording medium; a second scanning unit configured to move the recording medium in a second direction, the first and second directions being perpendicular; and a processing unit configured to control the recording head and the scanning units to perform the following: eject droplets onto the recording medium in two partially overlapping passes of the recording head in the first direction, wherein the overlapping passes create, on the recording medium, an overlap portion having a first print resolution, and a non-overlap portion having a second print resolution that is of lower resolution than the first print resolution.

13. The image forming apparatus of claim 12, wherein the processing unit is configured to cause the second scanning unit to move, after the first pass, the recording medium a distance that is smaller than a print height of the recording head for the second pass.

14. The image forming apparatus of claim 12, the processing unit is further configured to cause the recording head and scanning units to print twice as many rows of ink dots in the overlap portion than in the non-overlap portion.

15. The image forming apparatus of claim 12, the processing unit is further configured to cause the recording head and scanning units to print a grid pattern of dots in the non-overlap portion, and to print a checkered pattern in the overlap portion, wherein the checkered pattern includes alternating rows and columns of dots, wherein in the overlap portion, the first and second passes do not print to a common row and do not print to a common column.

16. The image forming apparatus of claim 12, wherein the two partially overlapping passes of the recording head in the first direction form horizontal rows of dots on the recording medium, and the print resolution of the overlap portion is a number of rows of dots in a predetermined vertical area of the recording medium.

17. A printing method, comprising: identifying a first portion of a recording medium for which transport errors are to be minimized; printing rows of dot positions on the recording medium by successive scans of a recording head in a main scan direction, wherein the first portion of the recording medium is printed at a higher row resolution than other portions of the recording medium;

wherein two of the successive scans print at a first row resolution and are partially overlapping, and the method further includes changing a relative position between the recording head and recording medium between the two successive scans so that, in an overlapping area of the scans, rows of dots formed by a first of the successive scans lie between rows of dots formed by a second of the successive scans.

18. The printing method of claim 17, wherein the recording head includes a plurality of printing elements arranged in an auxiliary scanning direction, perpendicular to the main scan direction, the method further comprising: using a subset of the printing elements for every pass in the first portion, and for some, but not all, passes in other portions of the recording medium.

19. The printing method of claim 17, wherein the successive scans are interlacing scans.

20. The method of claim 17, wherein a print resolution in the overlapping area is higher than a print resolution in non-overlapping areas of the recording medium.

* * * * *

UNITED STATES PATENT AND TRADEMARK OFFICE
CERTIFICATE OF CORRECTION

PATENT NO. : 8,213,046 B2  
APPLICATION NO. : 12/241732  
DATED : July 3, 2012  
INVENTOR(S) : Masashi Ueda et al.

Page 1 of 1

It is certified that error appears in the above-identified patent and that said Letters Patent is hereby corrected as shown below:

Title Page 2, Item (56) under Foreign Patent Documents:
Please delete "JP 61120578 6/1989" and replace with --JP 61120578 6/1986--

Signed and Sealed this  
Ninth Day of April, 2013

Teresa Stanek Rea  
*Acting Director of the United States Patent and Trademark Office*